US006812826B2

(12) United States Patent
Buhler et al.

(10) Patent No.: US 6,812,826 B2
(45) Date of Patent: Nov. 2, 2004

(54) TWO TIRE IRRIGATION VALVE CONTROLLER

(75) Inventors: Kirk Buhler, Corona, CA (US); Tony Givargis, Anaheim Hills, CA (US)

(73) Assignee: Aqua Conserve, Inc., Riverside, CA (US)

( * ) Notice: Subject to any disclaimer, the term of this patent is extended or adjusted under 35 U.S.C. 154(b) by 142 days.

(21) Appl. No.: 10/009,868

(22) PCT Filed: Jan. 18, 2001

(86) PCT No.: PCT/US01/02124

§ 371 (c)(1),
(2), (4) Date: Dec. 11, 2001

(87) PCT Pub. No.: WO02/058254

PCT Pub. Date: Jul. 25, 2002

(65) Prior Publication Data

US 2003/0006882 A1 Jan. 9, 2003

(51) Int. Cl.[7] .......................... H04M 11/04; G05D 11/00
(52) U.S. Cl. ............................ 340/310.01; 340/310.06; 700/284; 239/71; 239/DIG. 15
(58) Field of Search ...................... 340/310.01, 310.02, 340/310.06, 3, 713, 53; 700/9, 11, 16, 282, 284; 137/78.2, 624.11, 624.2; 239/67, 69, 70, 71, DIG. 15

(56) References Cited

U.S. PATENT DOCUMENTS

| 3,729,710 A | * | 4/1973 | Sherwin ................. 340/310.02 |
| 4,004,612 A | * | 1/1977 | Hummel et al. ........ 137/624.11 |
| 4,131,882 A | | 12/1978 | Hollabaugh et al. ... 340/310.01 |
| 4,176,395 A | | 11/1979 | Evelyn-Veere et al. ..... 700/284 |
| 5,740,031 A | * | 4/1998 | Gagnon ........................ 239/63 |
| 5,839,658 A | | 11/1998 | Sarver ............................ 239/1 |
| 6,229,432 B1 | * | 5/2001 | Fridley et al. ......... 340/310.01 |
| 2002/0053970 A1 | * | 5/2002 | Plummer ............... 340/310.01 |

* cited by examiner

Primary Examiner—Donnie L. Crosland
(74) Attorney, Agent, or Firm—Rutan & Tucker

(57) ABSTRACT

An irrigation controller provides a current to operate an irrigation valve assembly and superimposes a data stream on the current. The current may be either alternating current or direct current. Preferably the current is transmitted over a two-wire link. The irrigation valve assembly includes a decoder, a solenoid and an irrigation valve. It is contemplated that the decoder will communicate bi-directionally with the irrigation controller. The data stream will be an encoded control signal that is sent at a rate greater than 1 byte per second. Additionally, the encoded control signal may be sent at a rate greater than or less than the rate of the current.

10 Claims, 6 Drawing Sheets

TWO TIRE IRRIGATION VALVE CONTROLLER

FIELD OF THE INVENTION

The field of the invention is irrigation valve control.

BACKGROUND OF THE INVENTION

Most conventional irrigation systems comprise: an irrigation controller; solenoids that are activated by the irrigation controller; valves that are opened and closed by the solenoids; and sprinkler heads or other types of water distribution apparatus for applying water to a landscape when the valves are open. Wires run from the irrigation controller to the solenoid/valve units. With early irrigation systems, there was a separate set of wires running to each solenoid/valve unit. One line is for delivering low voltage power and the second line is the common return line to complete the circuit. Additionally, another set of wires went from the irrigation controller to the solenoid/valve unit for controlling the opening and closing of the valves. With irrigation systems that have several valves or when valves are placed over a wide area, as with some large golf courses, public parks, etc. it may be quite expensive to install two sets of wires to each solenoid/valve unit Today there are known irrigation systems that use one set of wires, one set of wires plus a third wire, or two sets of wires from the irrigation controller to connect to all of the solenoid/valve units. Generally a coded control message is sent over the wire to the solenoid/valve units. Each solenoid/valve unit has a decoding mechanism that can decode the coded control message to affect the opening and closing of the valves. Some known irrigation systems send the encoded control message over the power line wires and others have separate wires for transmission of the encoded control message. Irrigation systems such as those mentioned above are discussed in U.S. Pat. No. 4,131,882 issued December, 1978 to Hollabaugh, et al., U.S. Pat. No. 4,176,395 issued November, 1979 to Evelyn-Vecre, et al., U.S. Pat. No. 4,209,131 issued June, 1980 to Barash, et al., U.S. Pat. No. 5,048,755 issued September, 1991 to Dodds and U.S. Pat. No. 5,839,658 issued November, 1998 to Sarver. The problem with the above mentioned irrigation systems is that either a wire, separate from the power wire, is used to transmit the encoded message from the irrigation controller to the solenoid/valve unit or if the encoded message is transmitted over the power line the alternating-current power is significantly affected to permit the sending of the encoded message.

What is needed is a simplified irrigation valve controller that can operate off of two wires, and where the transmission of the control data only minimally affects the current to the valves.

SUMMARY OF THE INVENTION

The following invention provides an irrigation controller that provides a current to operate an irrigation valve assembly and superimposes a data stream on the current. The current may be either alternating current or direct current. Preferably the current is transmitted over a two-wire link. Alternatively, the current may be transmitted over less than or more than a two-wire link.

In a preferred embodiment of the present invention the irrigation valve assembly includes a decoder, a solenoid and an irrigation valve. It is contemplated that the decoder will communicate bi-directionally with the irrigation controller.

It is contemplated that the data stream will be an encoded control signal that is sent at a rate greater than 1 byte per second. Additionally, the encoded control signal may be sent at a rate greater than or less than the rate of the current.

Various objects, features, aspects, and advantages of the present invention will become more apparent from the following detailed description of preferred embodiments of the invention, along with the accompanying drawings in which like numerals represent like components.

DETAILED DESCRIPTION

Figure 1:
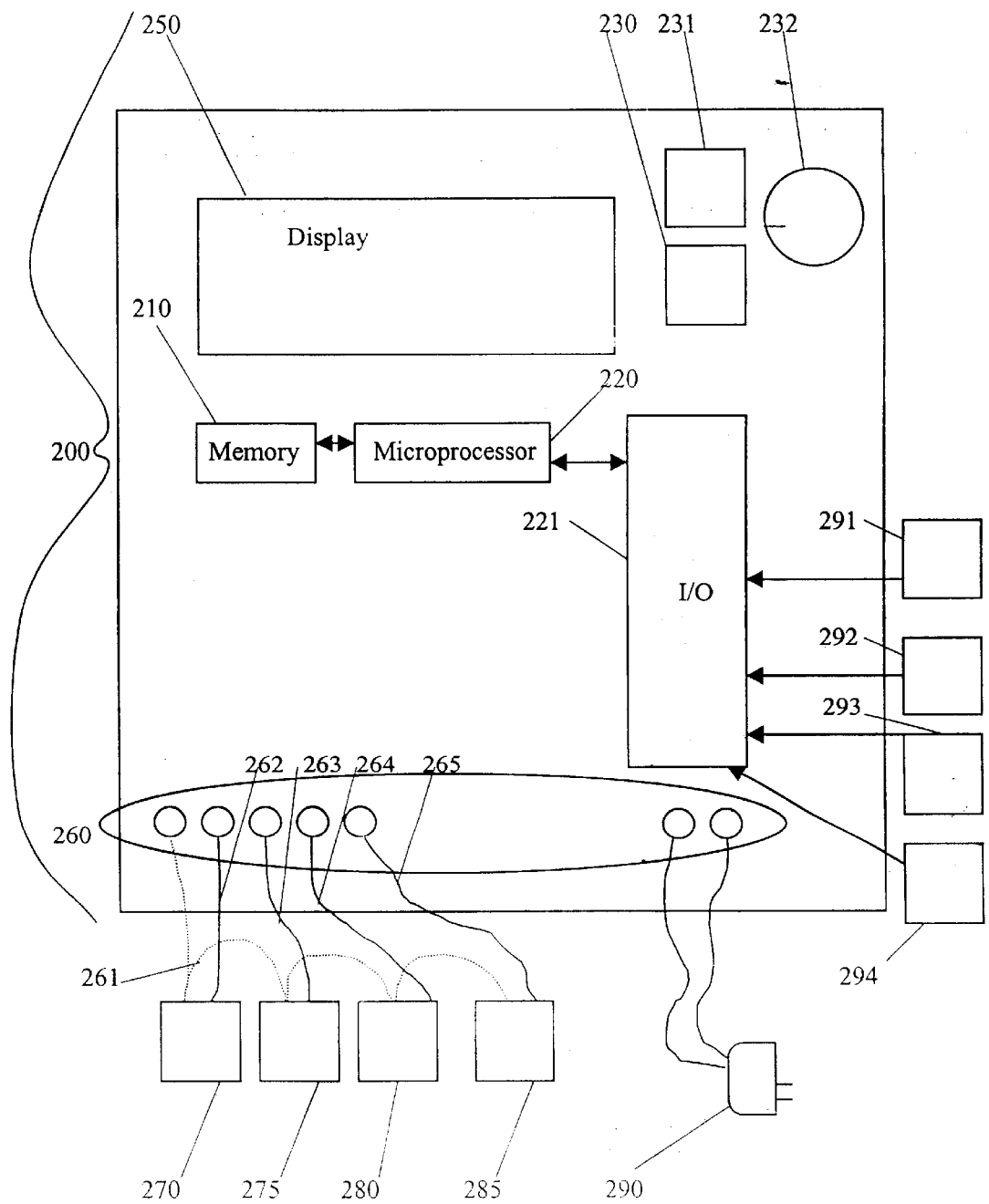
FIG. 1 is a schematic of an irrigation controller in a conventional multi-wire connection to irrigation valve assemblies of the prior art.

FIG. 1 is a schematic of an irrigation controller 200 in a prior art conventional multi-wire 261–265 connection to irrigation valve assemblies 270, 275, 280 and 285. The irrigation controller generally includes a microprocessor 220, an on-board memory 210, some manual input devices 230 through 232 (buttons and/or knobs), an input/output (I/O) circuitry 221 connected in a conventional manner, a display screen 250, electrical connectors 260 which are connected to a plurality of irrigation valve assemblies 270–285 and a power supply 290, a rain detection device 291, a flow sensor 292, a pressure sensor 293 and a temperature sensor 294.

With prior art irrigation systems each valve assembly generally had a minimum of two wires connecting the irrigation controller to each valve assembly with many having as many as four wires. Two wires provided power to the valve assembly and two wires were for the control of the valves. The cost of purchasing the wires and laying the multiple lines was generally very expensive.

Figure 2:
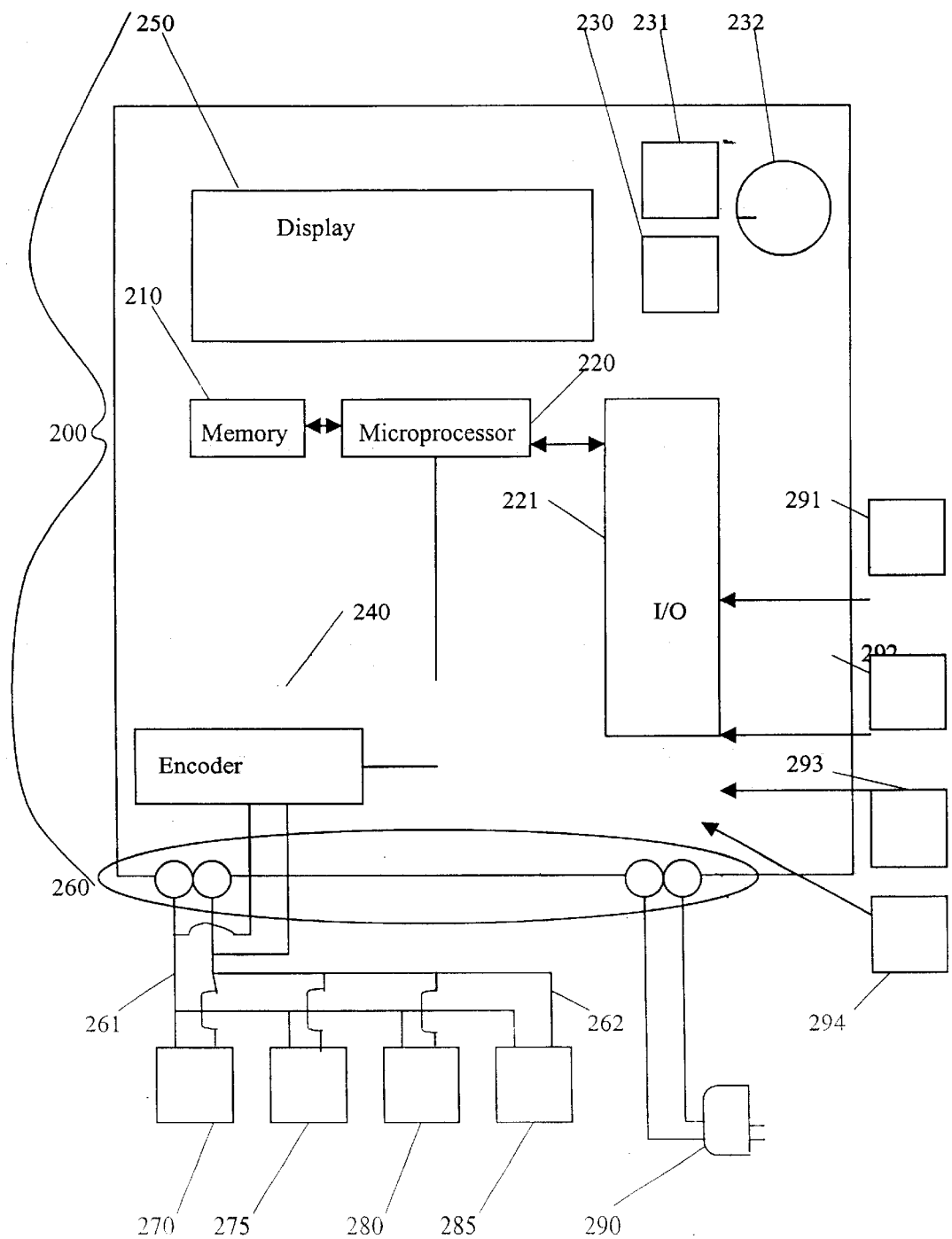
FIG. 2 is a schematic of an irrigation controller connected to irrigation valve assemblies according to an aspect of the present invention.

FIG. 2 is a schematic of an irrigation controller 200 according to the present invention with a two-wire connection 261, 262 to irrigation valve assemblies 270, 275, 280 and 285. The irrigation controller includes the same elements as in the above mentioned prior art controller, such as a microprocessor 220, an on-board memory 210, some manual input devices 230 through 232 (buttons and/or knobs), an input/output (I/O) circuitry 221 connected in a conventional manner, a display screen 250, a power supply 290, a rain detection device 291, a flow sensor 292, a pressure sensor 293, and a temperature sensor 294. The electrical connectors 260 are still connected to a plurality of irrigation valve assemblies 270, 275, 280 and 285 but there is only one set of wires 261 and 262 going to the irrigation valve assemblies 270, 275, 280 and 285. Preferably a two-wire link connects the irrigation controller with the irrigation valve assembly. Alternatively, there may be more or fewer wires connecting the irrigation controller to the irrigation valve assembly.

There is an additional element of the encoder 240 that provides encoded control signals for operating each valve assembly. Although an encoder 240 is shown in the figure, it can be appreciated that it may be any device that sends a data stream to the irrigation valve assembly. The data stream will be an encoded control signal that is sent at a rate greater than 1 byte per second. Additionally, the encoded control signal may be sent at a rate greater than or less than the rate of the current.

Each of these components by itself is well known in the electronic industry, with the exception of the programming of the microprocessor in accordance with the functionality set forth herein. There are hundreds of suitable chips that can be used for this purpose. At present, experimental versions have been made using a generic Intel 80C54 chip, and it is contemplated that such a chip would be satisfactory for production models.

In a preferred embodiment of the present invention the controller has one or more common communication internal bus(es). The bus can use a common or custom protocol to communicate between devices. There are several suitable communication protocols, which can be used for this purpose. At present, experimental versions have been made using 9600 Baud rate serial data communication, and it is contemplated that this communication method would be satisfactory for production models. This bus is used for internal data transfer to and from the EEPROM memory, and is used for communication with personal computers, peripheral devices, and measurement equipment including but not limited to utility meters, water pressure sensors, and temperature sensors.

Figure 3:
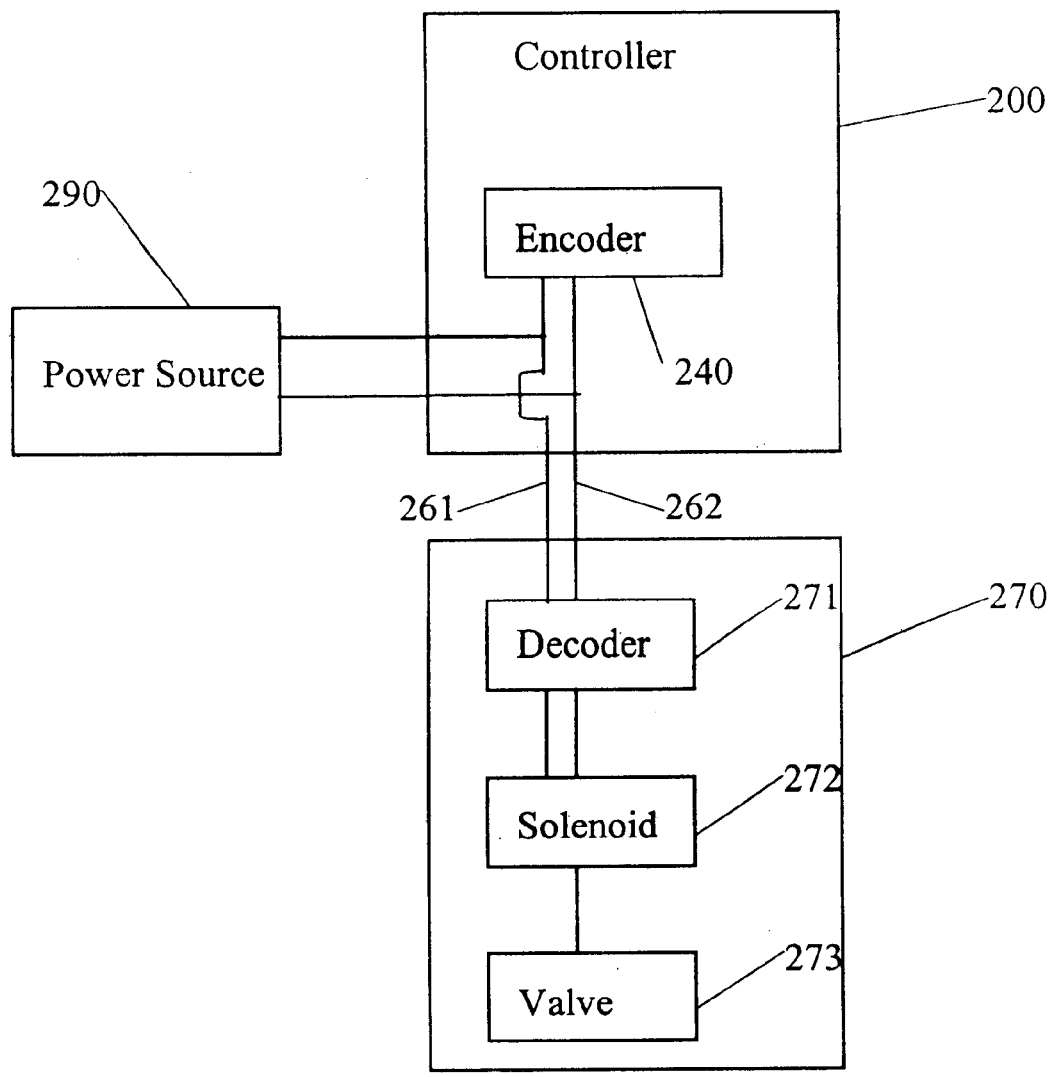
FIG. 3 is a block diagram of the encoder connected to an irrigation valve assembly

FIG. 3 is a block diagram of the encoder 240 connected to an irrigation valve assembly 270 according to an aspect of the present invention. The valve assembly 270 is composed of the decoder 271, solenoid 272, and the irrigation valve 273. The encoder 240 is preferably disposed in the controller 200. However, since the encoder has no controls and receives the control information from the microprocessor, it can be located in a devise separate from the irrigation controller 200. Wires from the encoder 240 are coupled with the wires 261, 262 from the power source 290 and connect to the decoder 271. The decoder 271 is connected to the solenoid 272 that is connected to a valve 273.

The encoder 240 provides encoded control signals that are specific for the opening and closing of a specific valve. The encoder 240 receives the control information from the microprocessor (FIG. 2) and superimposes the encoded control signals on the 28 VAC power lines 261, 262 to the irrigation valve assembly 270. The 120 VAC, from the power source 290, is converted to 28 VAC, which is the current required for the operation of the solenoid. The voltage could also be converted to 12 VDC to power and operate the solenoid.

Preferably the encoder 240 has a backup memory in case the irrigation controller or the communication link between the microprocessor and encoder 240 fail.

The decoder 271 receives the encoded control signal and decodes the control signal. A high pass filter (See FIG. 5) filters out the 28 VAC power line from the encoded control signal. If the signal is carried on 12 VDC power lines, the filter may not be required. If the control signal is specific for the valve to which the decoder 271 is connected the decoder 271 will activate the solenoid 272 which will cause the valve 273 to open or close.

Figure 4:
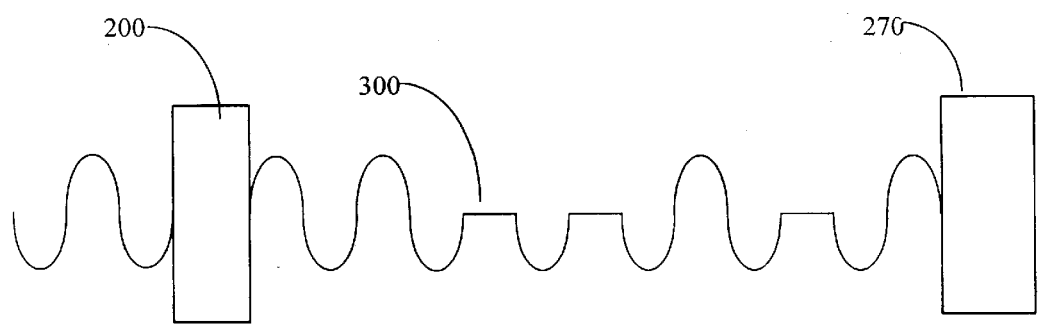
FIG. 4 is an example of a current waveform of the prior art.

FIG. 4 is a prior art example of the effect an encoded control signal may have on a waveform 300 when an encoded control signal is sent over a power current from an irrigation controller 200 to an irrigation valve assembly 270. The encoded control signal temporarily interrupts the current as the signal is being sent from the irrigation controller 200 to the irrigation valve assembly 270. This is indicated by the top of the waveform 300 being chopped off by 25% or more resulting in a reduction of the current required for activation of the solenoid.

Figure 5:
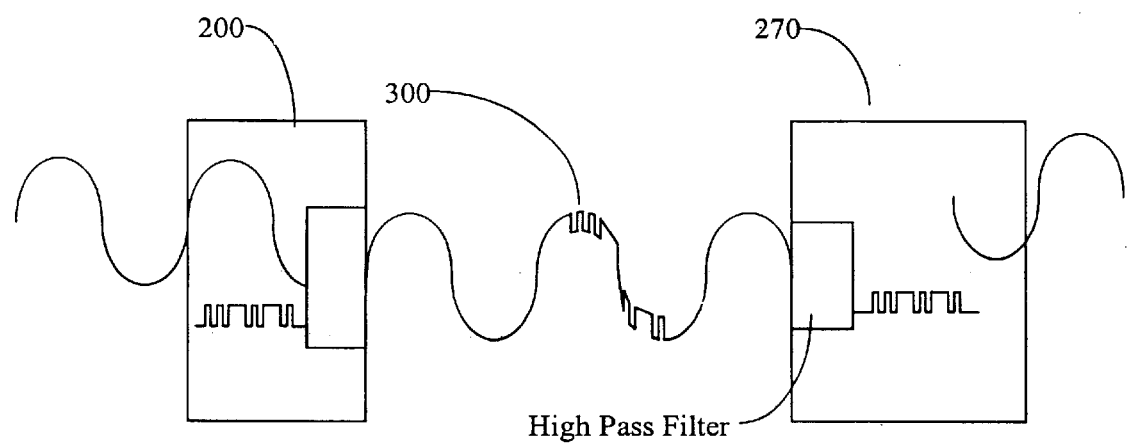
FIG. 5 is an example of a current waveform according to an aspect of the present invention.

FIG. 5 is an example of the effect an encoded control signal may have on a waveform 300 when an encoded signal is superimposed on a power current from an irrigation controller 200 to an irrigation valve assembly 270 according to an aspect of the present invention. Superimposed as defined herein means that less than 25% of the waveform 300 is chopped off thereby allowing most of the current to be available to activate the solenoid to open or close the irrigation valve.

Figure 6:
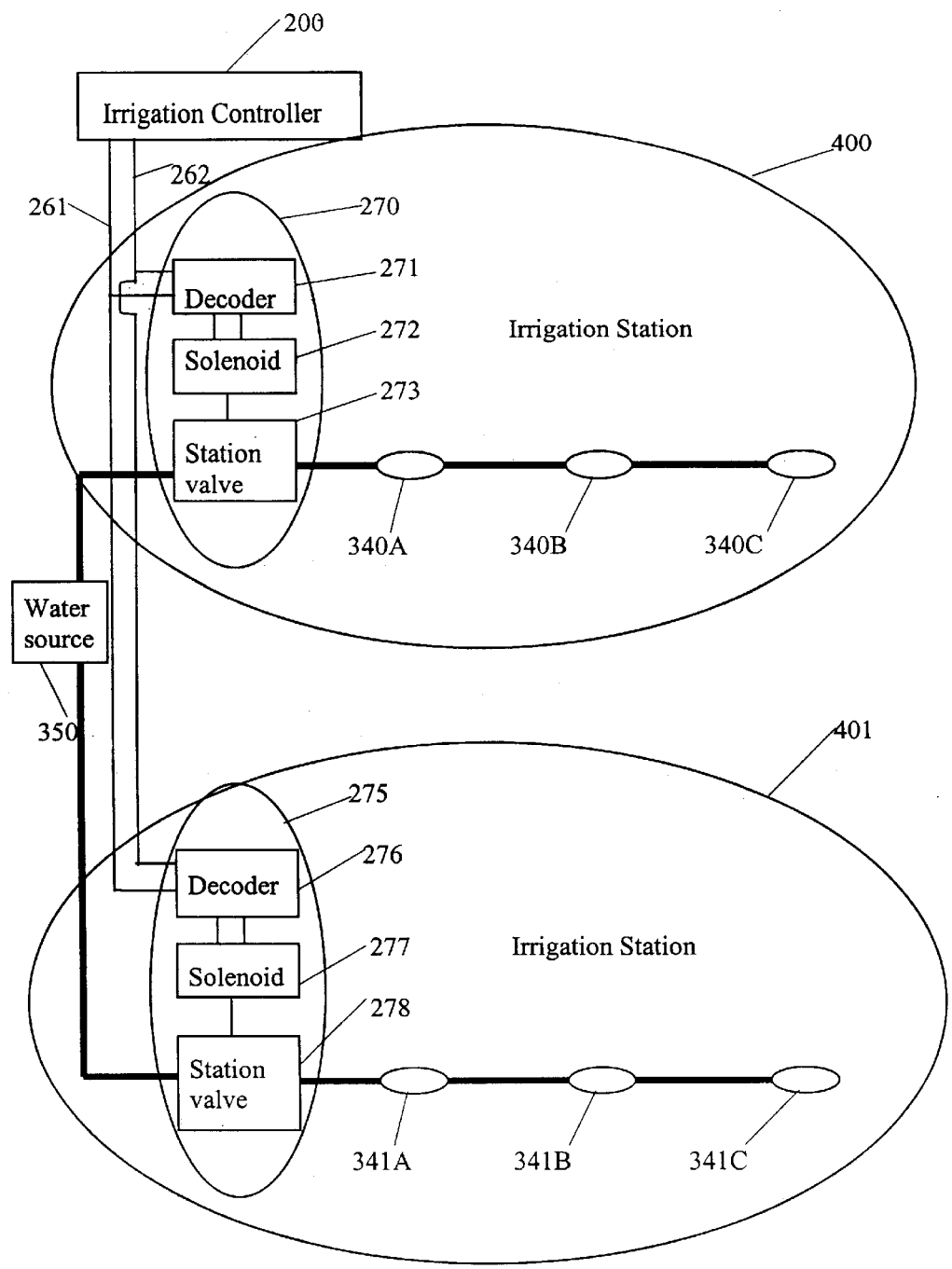
FIG. 6 is a block diagram of an irrigation system with two irrigation stations shown according to an aspect of the present invention.

FIG. 6 is a block diagram of an irrigation system according to an aspect of the present invention. Although, only two irrigation stations 400, 401 are shown the irrigation controller 200 can control a plurality of irrigation stations. A program is stored in the memory 220 (See FIG. 2), which may set start times and run periods for each irrigation station 400, 401 or start times and run times may be set manually. The irrigation valve assemblies 270 and 275 are composed of decoders 271 and 276, solenoids 272 and 277, and valves 273 and 278, respectively. Although, only one decoder is shown with each valve, each decoder may control more than one valve. The decoders 271, 276 decode the encoded control signals sent over the power lines 261–262. Based on the control signal decoded by each decoder 271, 276, the solenoids 272, 277 are activated to open and close the valves 273, 278. When the valves 273 and 278 are open, water is allowed from the water source 350 to be distributed to one or more (two are shown but it may be any number) irrigation sprinkler heads 340A–340C and 341A–341C, respectively.

Thus, specific embodiments and applications of the present invention have been disclosed. It should be apparent, however, to those skilled in the art that many more modifications besides those described are possible without departing from the inventive concepts herein. The inventive subject matter, therefore, is not to be restricted except in the spirit of the appended claims.

What is claimed is:

1. An irrigation controller that provides a current to operate an irrigation valve assembly over a unidirectional line, the current comprising a data stream superimposed on a power signal, wherein the power signal has a peak power level and the data stream is superimposed on the power signal in a manner that reduces the peak power level by less than 25%.

2. The irrigation controller of claim 1, wherein the current comprises alternating current.

3. The irrigation controller of claim 1, wherein the current comprises direct current.

4. The irrigation controller of claim 1, wherein the current is transmitted over a two-wire link.

5. The irrigation controller of claim 1, wherein the current is transmitted over a one-wire link.

6. The irrigation controller of claim 1, wherein the irrigation valve assembly includes a decoder, a solenoid and an irrigation valve.

7. The irrigation controller of claim 1, wherein the data stream comprises an encoded control signal.

8. The irrigation controller of claim 7, wherein the encoded control signal is sent at a rate greater than 1 byte per second.

9. The irrigation valve control of claim 7, wherein the encoded control signal is sent at a rate greater than the rate of the current.

10. The irrigation valve control of claim 7, wherein the encoded control signal is sent at a rate less than the rate of the current.

* * * * *